United States Patent [19]

Kirkendall

[11] Patent Number: 5,443,603
[45] Date of Patent: Aug. 22, 1995

[54] LIGHT WEIGHT CERAMIC ABRASIVE MEDIA

[75] Inventor: Gregory S. Kirkendall, Lake Wales, Fla.

[73] Assignee: Washington Mills Ceramics Corporation, North Grafton, Mass.

[21] Appl. No.: 179,935

[22] Filed: Jan. 11, 1994

[51] Int. Cl.$^6$ ............................................... C09C 1/68
[52] U.S. Cl. ....................................... 51/296; 51/308; 501/80
[58] Field of Search ......................... 51/293, 296, 308; 501/80

[56] References Cited

U.S. PATENT DOCUMENTS 3,950,175  4/1976  Lachman et al. ..................... 501/80
3,993,495  11/1976 Galliath et al. ...................... 501/80
5,049,166  9/1991  Kirkendall ............................ 51/293

Primary Examiner—Deborah Jones
Attorney, Agent, or Firm—Michael L. Dunn

[57] ABSTRACT

A method for manufacturing abrasive tumbling media comprising discrete abrasive particles having a preselected size and shape made by firing a formed mixture primarily comprising a particulate ceramic material, which method comprises adding at least 10% of hollow ceramic microspheres to said mixture prior to firing to obtain particles having a final fired bulk density below 65 lbs/ft.$^3$. The ceramic material preferably comprises at least 30 percent clay and the hollow microspheres have a shell consisting essentially of from 58 to 65 weight percent silica and from 28 to 33 percent by weight alumina, a shell thickness of about 10% of the diameter of the microsphere and an average particle size of from about 50 to 100 microns. The invention further comprises an abrasive tumbling media comprising discrete abrasive particles having a preselected size and shape made by firing a formed mixture primarily comprising a particulate ceramic material including at least 10% of hollow ceramic microspheres and having a final fired bulk density below 65 lbs/ft.$^3$.

6 Claims, No Drawings

LIGHT WEIGHT CERAMIC ABRASIVE MEDIA

BACKGROUND OF THE INVENTION

This invention relates to light weight abrasive tumbling media for use in mass industrial finishing operations and to methods of making same. More particularly, this invention relates to the production of ceramic tumbling media consisting of discrete abrasive particles of essentially uniform size and shape which exhibit a final bulk density after firing below 65 lbs/ft.$^3$.

Abrasive tumbling media have long been used in mass industrial finishing operations for refining the surfaces of metallic and plastic parts. Such media have customarily included discrete abrasive particles of various sizes and shapes made from ceramics, porcelains, natural or synthetic stone, clay, and plastics. Conventional ceramic tumbling media exhibit a bulk density of 80 to 120 lbs/ft.$^3$ which can damage delicate parts during mass finishing operations. Plastic tumbling media having a significantly lower bulk density have commonly been used for such operations, but plastic gives off an undesirable effluent during production which is harmful to the environment and which may require treatment as a hazardous waste. Accordingly, there exists a need for improved light weight, low density ceramic tumbling media the production or use of which is not detrimental to the environment.

Such a light weight abrasive is for example described in U.S. Pat. No. 5,049,166. That light weight media is formed by using a gas generating material during processing. While the material described in the above patent is a vast improvement over previous materials, it still has certain disadvantages. In particular media wear is much higher than desired. Quantity of cut per unit weight is not as high as desired and porosity is higher than desired.

BRIEF DESCRIPTION OF THE INVENTION

Therefore, it is an object of the present invention to provide improved low density ceramic tumbling media suitable for refining or finishing delicate industrial parts.

It is a further object of this invention to provide improved low density abrasive tumbling media having a final fired bulk density below 70 and preferably below about 65 lbs/ft.$^3$.

It is still a further object of the invention to provide light weight ceramic tumbling media, the production or use of which is not detrimental to the environment.

In addition it is an object of the present invention to provide a lightweight media having improved wear, cut, and lower porosity.

In accordance with the present invention there is provided a novel light weight abrasive media comprising a formed and fired composition comprising a formable ceramic composition including at least 10 weight percent hollow ceramic microspheres.

The invention further comprises the method for manufacturing such abrasive media consisting essentially of discrete abrasive particles having a predetermined size and shape by firing a formed mixture primarily comprising a formable ceramic composition including at least ten percent hollow ceramic microspheres by weight of solids with sufficient water for forming and cohesion to obtain a fired bulk density below 65 lbs/ft.$^3$.

The light weight media of the invention overcomes many of the problems associated with media of the prior art as previously discussed. In particular the media of the invention, when tumbled with fragile goods, does not cause nearly as much breakage or damage as prior art denser media. Furthermore the media of the invention has as much as little as 50% of the wear of light weight media as described in U.S. Pat. No. 5,049,166 for the same quantity of media under the same conditions and at the same time can provide as much as 25% more cut. The media of the invention is therefore more efficient than the media described in the above patent. The media of the invention is more durable than such prior art light weight media which may be at least partly due to the fact that it has significantly less porosity, i.e. often less than 3% as compared with the media of U.S. Pat. No. 5,049,166 which could have as much as 25% porosity.

DETAILED DESCRIPTION OF THE INVENTION

"Light weight" as used herein means that the abrasive has a bulk density of from 45 to 65 pounds, preferably 50 to 60 pounds, per cubic foot as compared with conventional ceramic media used in tumbling operations which usually has a bulk density of from 80 to 100 pounds per cubic foot.

"Abrasive" as used herein means that the media of the invention effectively removes surface imperfections from metallic and hard plastic materials, when such materials are tumbled with the media.

"Hollow microsphere" means a small sphere having an average particle size of from 5 to 200 microns and preferably from 40 to 120 microns. Such hollow microspheres are available commercially and are made by known methods such as by impinging a molten stream of ceramic with a steam of pressurized air. An example of such a microsphere are Extendospheres® sold by the PQ Corporation and more particularly Extendospheres SF-14 which have an average particle size of about 57 microns, a particle range of from about 10 to 100 microns, a bulk density of 25 pounds per cubic foot and a shell thickness of about 10% of the diameter and which comprise an aluminosilicate composition comprising silicon, aluminum and iron expressed as their oxides as follows: silica 58–65 weight percent, alumina 28–33 weight percent and iron oxide up to about 4 weight percent.

The tumbling media produced by the method of this invention may be manufactured into any desired linear symmetrical or nonsymmetrical shape, including pyramids, spheres, cylinders, triangles, tri-stars, diamonds, arrowheads and ellipses, depending upon the desired end use. When cone shaped particles are contemplated, typically they will be produced in one of three sizes (i.e., $\frac{1}{2}"$w $\times \frac{5}{8}"$h, $\frac{3}{4}"$w $\times \frac{7}{8}"$h and $1\frac{1}{8}"$w $\times 1\frac{1}{4}"$h, plus or minus 0.020"), however, size may vary depending upon end use application. The base of the cone is essentially smooth and flat and the apex of the cone is curvedly tapered to a rounded point. Desirable shapes are those that provide a plurality of working edges so as to be capable of applying fast, effective abrasion without lodging, chipping and causing environmental problems. The light weight media produced herein offer the added advantage of being suitable for use with parts which require delicate finishing such as aircraft engine and structural parts, automotive parts, golf clubs, jewelry, silverware, special aluminas and steels, that are easily deformed and impinged by conventional high density media. Other shapes are usually of approximately the same size, e.g. a small dimension of from about one-half inch to a large dimension of about one and one-half inches.

The abrasive particles in accord with this invention are typically made from a ceramic/clay based formable or plastic mixture. The mixture is prepared as a flowable plastic mass which is extruded through one or more dies having the desired shape (e.g., triangular, cylindrical, etc.) to form a continuous rod or cylinder which may then be cut into any desired length. Or, alternatively, the continuous extruded rod may be further formed into other desired shapes (e.g., conical), by feeding it through a pair of cooperating mechanical forming members preferably mounted on opposing continuous rolls having recesses engraved or carved therein corresponding to the shape of particle desired. Preferably, the mixture is fed through the forming members as a rod or ribbon having a sufficient plasticity to ensure formability. Plasticity is measured by the percent of moisture contained in the mixture. Desirably, the moisture content will range from 12% to 18%. As the rod or ribbon passes between the cooperating forming members there is produced a plurality of discrete particles having an essentially uniform size and shape.

"Clay" as used herein means a mixture of powdered raw materials after water is added and the product is mixed (before drying and firing processes). "Ceramic" as used herein means that the basic raw materials are of the type used to manufacture various ceramic products. After the product is fired, it then becomes a vitrified ceramic. Ceramics include inorganic oxides or silicates which may be melted and then solidified into a crystalline, microcrystalline or glass material. Examples of such ceramics as may be used in accordance with the present invention include clays, mullites, silica, alumina, bauxites, magnesium aluminum silicate, feldspar and flint glass.

The shapes are made by forming a plastic mass by mixing ceramic particles having an average particle size of from submicron to 10 microns, hollow microspheres having a ceramic shell and sufficient water to obtain a plastic mass and forcing the plastic mass into molds of the desired shape. The amount of water used is sufficient to cause cohesion of the ceramic particles so that the formed shapes are stable. The formed "green" shapes are then removed from the molds, dried and fired to form the desired finished shapes.

Any known flowable ceramic based formulation may be used in forming the light weight particles of this invention. Generally, a conventional formulation will contain some or all of the following ingredients: ball clay, kaolin, bentonite, feldspar, talc, alumina, emery, quartz, silicon carbide, silicon and/or synthetic emery. These materials are finely divided and blended together to form an essentially homogenous mixture. Many known additives may also be incorporated into the mixture including other abrasives such as titanium carbide, zirconia, metallic particles such as tin or zinc, metal oxides, carbides and nitrides, fillers combined with abrasives such as silicon carbide, emery (synthetic or natural) and aluminum oxide. Commercially available lubricants including additive A (extrusion aid) may also be added along with various plasticizers and binding agents including but not limited to the following: ball clay, kaolin and bentonite clays.

Metal carbonates, e.g. calcium carbonate, may also be added as described in U.S. Pat. 5,049,166; however, in lower percentages, e.g. 3 to 8 percent. Higher percentages are usually avoided since they tend to reduce the strength and wear characteristics of the media and increase porosity.

The prior art discloses numerous ceramic compositions suitable for producing tumbling media which are formulated to have a sufficient viscosity to be flowable yet able to maintain their shape once formed. Accordingly, the invention herein is not intended to be limited to a particular ceramic composition. After formation, the discrete particles are fired at temperatures between 1130° C. to 1150° C. to produce final particles having the desired rigidity and hardness for a particular end use application.

Preferred formulations for producing the light weight particle of this invention is as follows:

TABLE 1

| ITEM | RAW MATERIALS | PREFERRED COMPOSITION | PREFERRED RANGE |
| --- | --- | --- | --- |
| 1 | Ball Clay | 35.00% | 25 to 40 |
| 2 | Kaolin | — | 0 to 15 |
| 3 | Bentonite | 5.00% | 2 to 8 |
| 4 | Feldspar | 35.00% | 25 to 40 |
| 5 | Talc | 5.00% | 2 to 8 |
| 6 | Silica | — | 0 to 12 |
| 7 | Hollow ceramic microspheres | 15.00% | 10 to 20 |
| 8 | Metal carbonate | 5.00 | 0 to 8 |

As is well known in the art, the above preferred formulations may be adjusted for different firing temperatures. For example, if a higher firing temperature is desirable, the percentages of feldspar, silica and calcium carbonate may be decreased and the percentages of ball clay, kaolin and talc may be increased to produce the required rigidity and hardness of the final product. For a lower firing temperature, this procedure would be reversed.

The percentages of items 1, 2 and 3 may vary as long as the total percentage does not go above approximately 45%. In addition, the total percentage of items 4 and 6 should likewise not go above approximately 45%.

The percentage of hollow microspheres may range from 10% to 20% or more. Above about 25% the finished particles may be too porous to maintain the necessary rigidity and hardness.

EXAMPLE 1

Light weight abrasive conical tumbling media of the invention (LW2) were prepared in $\frac{3}{4}'' \times \frac{7}{8}''$ conical shapes a formable mixture consisting of the following ingredients:

| | |
| --- | --- |
| Ball clay | 35% |
| Bentonite | 5% |
| Feldspar | 35% |
| Talc | 5% |
| Calcium Carbonate | 5% |
| Extendospheres SF-14 | 15% |

The particles formed were separated and fired in a Swindell and Dressler Tunnel Kiln at a maximum temperature of 1150° C. for a total cycle time of 18 hours. After firing, the particles were cooled and the bulk density was determined by suspending the particles in water as follows:

Five random samples taken from a production run were weighed dry (dry =D) on an O Haus Centogram balance, 311 gram capacity. These pieces were placed in a container having a screen preferably about 1" from the container bottom to hold the pieces in a suspended state. The pieces in the container were boiled for two hours and remained soaking in this water for 24 hours. The pieces were removed from the container, and then weighed while suspended in a crucible of water (suspended =S). They were then weighed again wet, i.e., "wet" meaning excess water is removed from the outside surface of each piece (wet=W).

As a result of the above, the bulk density of the media of the invention was found to be 65 pounds per cubic foot and the porosity was found to be less than 3 percent as compared with a porosity of 25% for material manufactured in accordance with the method described in U.S. Pat. No. 5,049,166.

a Volume=W−S
    b Porosity=W−D+V×100
    c Bulk Density=D+Y

EXAMPLE 2

Conventional fine grained, extremely hard tumbling media (CW), exhibiting a bulk density of about 85 lbs/cu. ft., were also prepared as described in Example 1 from a formable mixture consisting of the following ingredients:

| | |
|---|---|
| Ball clay | 33.4% |
| Kaolin | 13.3% |
| Bentonite | 5.0% |
| Feldspar | 33.3% |
| Talc | 5.0% |
| Silica | 10.0% |
| Total | 100.0% |

EXAMPLE 3

Lightweight media was made in accordance with Example 1 of U.S. Pat. No. 5,049,166, (LW1) consisting of the following ingredients:

| | |
|---|---|
| Ball clay | 26.7% |
| Kaolin | 10.7% |
| Bentonite | 4.0% |
| Feldspar | 26.7% |
| Talc | 4.0% |
| Silica | 8.0% |
| Calcium carbonate | 20.0% |

Conventional (CM), U.S. Pat. No. 5,049,166 lightweight (LW1) and light weight conical tumbling media of the invention (LW2) were used in the mass finishing of aluminum parts and were compared with regard to media loss, metal loss, efficiency and chipping or fracturing. A Harperizer grinding test using aluminum angle was performed as follows.

A Harperizer consisting of two drums mounted on the periphery of a turret, was loaded with a test sample comprising 1,860 grams of tumbling media and 150 grams of aluminum angle. The turret was rotated at a high speed (12 g's) building up centrifugal force and compressing the parts and media into a tightly compacted mass. Meanwhile, the drums were counter-rotated at a slower speed causing a smooth sliding action of the media against the parts. Water flows continuously through the system at a rate of about 1 gallon per minute. This rate is measured by a flow meter. The rotation of the turret and the speed of the barrel are fixed by the manufacturer of this equipment. The test sample placed in the barrel was processed in the Harperizer for 1 hour. The Harperizer automatically shuts down at the end of the 1 hour time interval. Both the media and the metal were then placed in a container and dried utilizing a centrifugal dryer for approximately 3 to 5 minutes. When completely dried, the metal and media were weighed separately. Their weight losses were then calculated into percentages and recorded. Small chips remaining in the container were weighed and the percent recorded to highlight any potential chipping problems.

The media loss was calculated by subtracting the media finish weight from the media start weight and dividing that total by the start weight. The metal loss was calculated by subtracting the metal finish weight from the metal start weight and dividing that total by the start weight. The efficiency of the system was calculated by dividing media loss into metal loss. The percent shipping loss was obtained by weighing the chips separately from the media to get a total chip weight which is then divided by the media loss weight. An unacceptably high chipping level was determined to be above 0.50% for both the conventional composition and the light weight composition.

The results of the Harperizer test are summarized in Table 2 below.

Table 2

Harperizer test on light weight (LW1) ceramic and conventional media (CM) versus the lightweight media of the invention (LW2).

| | (1/16" × 1" × 1" aluminum angle) | | |
|---|---|---|---|
| | ⅜ × ⅜ LW1 | ⅜ × ⅜ CM | ⅜ × ⅜ LW2 |
| Media Loss | 21.32% | 5.47% | 11% |
| Metal Loss | 9.69% | 6.95% | 12% |
| Efficiency | .4545% | 1.2705% | 1.09% |
| Chips | nil | 5.58% | nil |

As may be seen from Table 2, the media of the invention had significantly less media loss and significantly better cut than the lightweight media of U.S. Pat. No. 5,049,166 and had better cut than conventional high density media. The finish on the aluminum metal using LW1 and LW2 showed a much smoother surface finish (higher RMS) and had a much better radius due to the higher cut rate of the light weight media.

It is to be understood that the embodiment disclosed herein is representative of one of many possible embodiments and modifications thereof, and is intended to be illustrative rather than limited thereto.

What is claimed is:

1. A method for manufacturing abrasive tumbling media comprising discrete abrasive ceramic particles having a formed size and shape made by firing a formed mixture primarily comprising a particulate raw material used to manufacture a ceramic product, which method comprises adding at least 10% of hollow ceramic microspheres to said mixture prior to firing to obtain particles having a final fired bulk density below about 65 lbs/ft$^3$.

2. The method of claim 1 wherein the particulate raw material comprises a clay.

3. The method of claim 1 wherein the hollow microspheres have a shell consisting essentially of from 58 to 65 weight percent silica and from 28 to 33 percent by weight alumina, a shell thickness of about 10% of the diameter of the microsphere and an average particle size of from about 50 to 100 microns.

4. An abrasive tumbling media comprising discrete abrasive ceramic particles having formed size and shape made by firing a formed mixture primarily comprising a particulate raw material used to manufacture a ceramic product and including at least 10% of hollow ceramic microspheres and having a final fired bulk density below about 65 lbs/ft$^3$.

5. The tumbling media of claim 4 wherein the hollow microspheres have a shell consisting essentially of from 58 to 65 weight percent silica and from 28 to 33 percent by weight alumina, a shell thickness of about 10% of the diameter of the microsphere and an average particle size of from about 50 to 100 microns.

6. The media of claim 5 wherein the particulate raw material comprises at least 30 weight percent clay.

* * * * *